Aug. 15, 1933.  J. C. McKAY ET AL  1,922,106
TIRE CHAIN
Filed Nov. 30, 1931   3 Sheets-Sheet 1

INVENTORS
James C. McKay
& Benjamin J. King
By Archworth Martin,
Attorney.

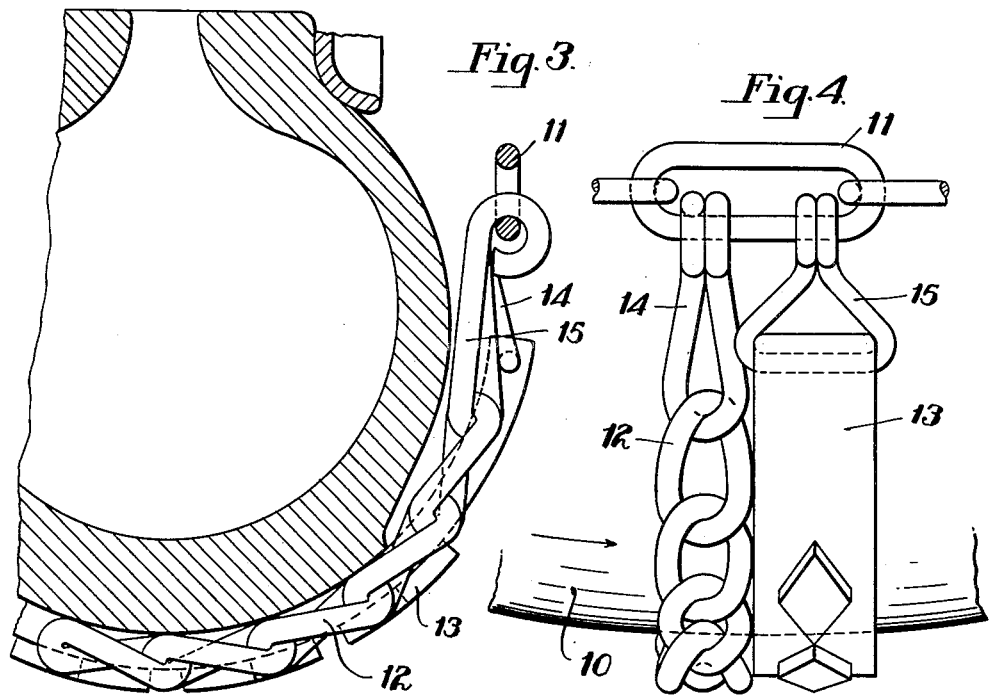
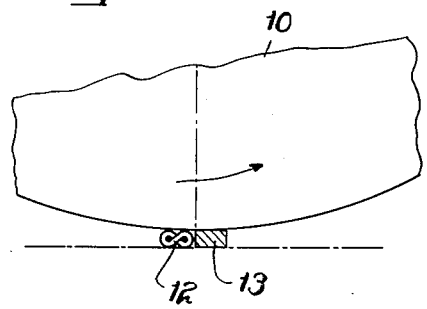
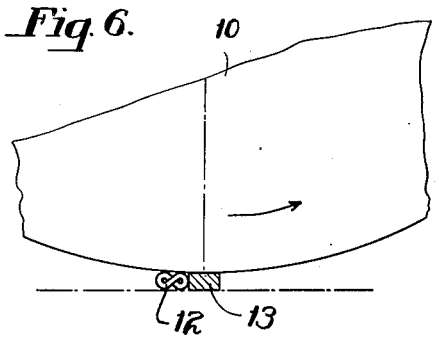
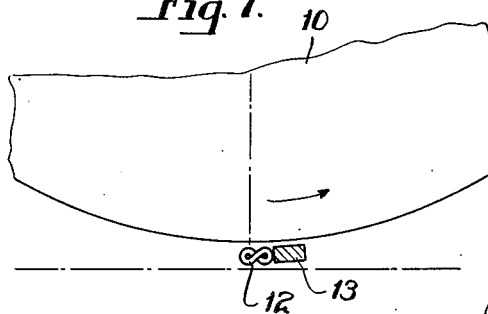

Aug. 15, 1933.  J. C. McKAY ET AL  1,922,106
TIRE CHAIN
Filed Nov. 30, 1931  3 Sheets-Sheet 3

INVENTORS
James C. McKay
& Benjamin J. King,
By Archworth Martin,
Attorney.

Patented Aug. 15, 1933

1,922,106

UNITED STATES PATENT OFFICE 1,922,106

TIRE CHAIN

James C. McKay and Benjamin J. King, Pittsburgh, Pa., assignors to The McKay Company, Pittsburgh, Pa., a Corporation of Pennsylvania Application November 30, 1931
Serial No. 577,878

8 Claims. (Cl. 152—14)

Our invention relates to tire chains of the non-skid type, and has for one of its objects the provision of a chain of improved form which has cross chains or tread members that include both metal links and rubber or fibrous straps.

One object of our invention is to provide a non-skid chain that possesses the advantages both of metal and of rubber or fiber, and also various advantages resulting from the employment of rubber and steel chains in definite relative positions.

Another object of our invention is to provide a tire chain having metal tread links, and non-metallic cross straps, so arranged that under certain conditions of operation, the metal cross links will be relieved of excessive wear, while under other operating conditions, the metal cross chains will function effectively after the manner of ordinary metal chain structures.

Figure 1:
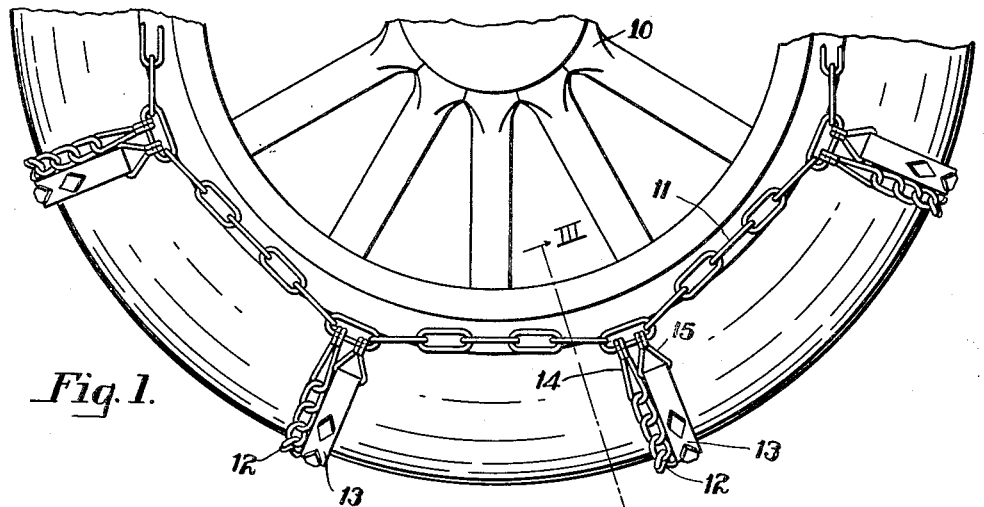
Figure 2:
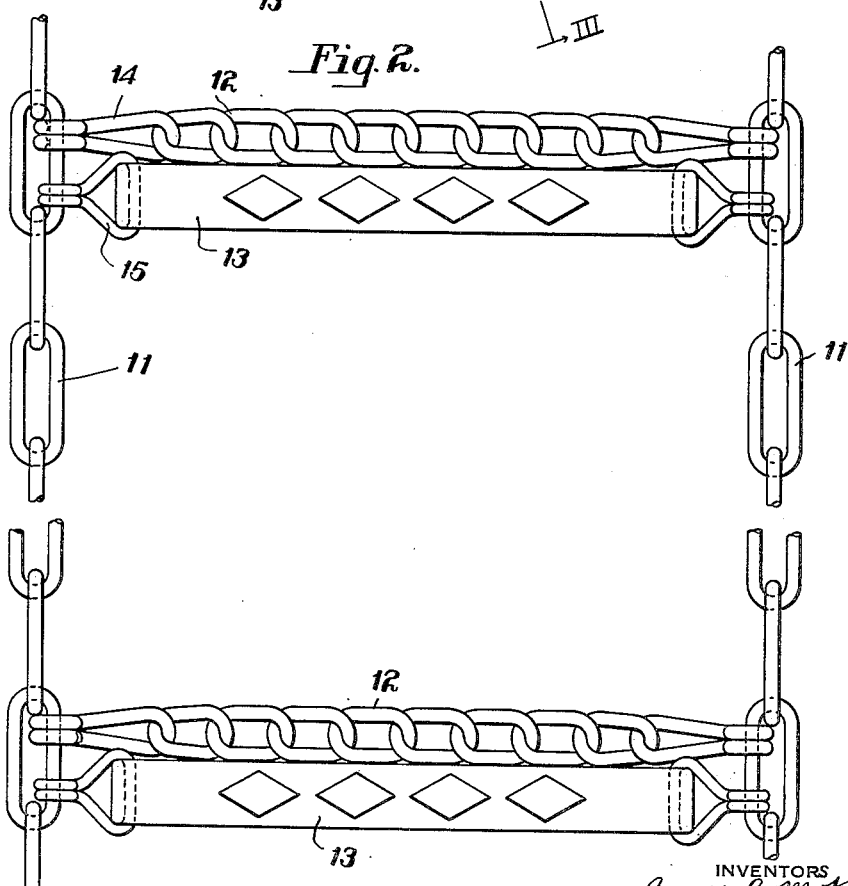
Figure 9:
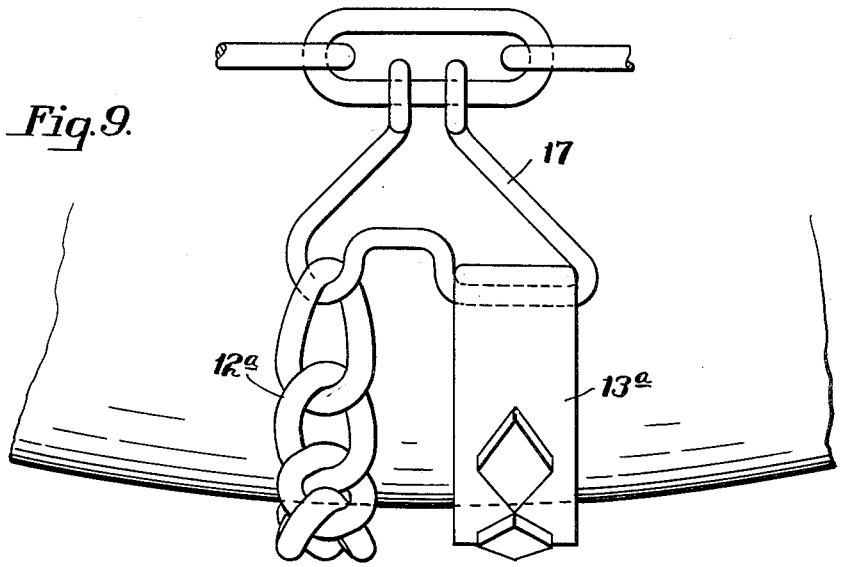
Figure 8:
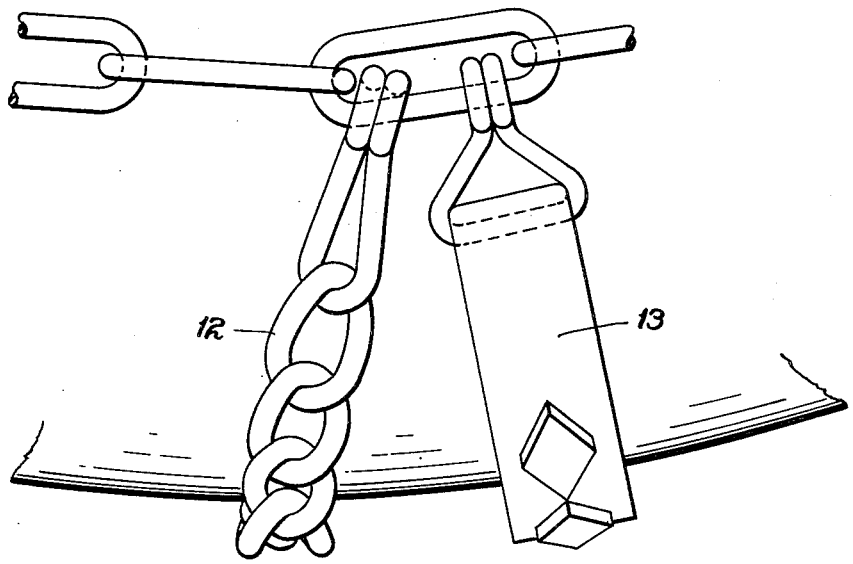

Some of the forms which our invention may take are shown in the accompanying drawings, wherein Figure 1 is a fragmentary side view of a chain structure applied to an automobile wheel; Fig. 2 is a fragmentary plan view of a chain, on an enlarged scale; Fig. 3 is a view, on an enlarged scale, taken on the line III—III of Fig. 1; Fig. 4 is a view of a portion of the structure of Fig. 1, on an enlarged scale; Figs. 5, 6 and 7 are diagrammatic views showing the manner in which the chain functions at various rotative speeds of the wheel to which they are applied; Fig. 8 shows the manner in which the chain functions during a braking period; and Fig. 9 is a view showing a modification of the structure of Fig. 4.

Referring first to Figs. 1 to 4, we show a portion of an automobile wheel 10, to which an anti-skid chain is applied. Side chains or tension members 11 may be of any well-known form. The metallic cross chains are indicated by the numeral 12 and the numeral 13 indicates a cross strap which may be of rubber, fiber, or other suitable material, and may be made according to the showing of Patent No. 1,577,684, issued March 23, 1926, to Frank A. Bond. Hooks 14 and 15 are employed for connecting the cross chains 12 and 13 respectively to the side chains. These hooks may be of any suitable and well-known form.

The cross chains 12 and the straps 13 are preferably of approximately the same thickness, so that each will be effective to perform its function under certain predetermined conditions. However, either may be slightly thicker than the other in case it is desired that one of them shall take a greater amount of wear.

It is desired that the chains be applied in such manner that they will creep slightly on the tire, and to this end, we prefer that the non-metallic cross straps 13 be as loose or perhaps slightly looser on the tire than the cross chains 12. The cross members 12 and 13 are arranged in pairs, the two cross members of each pair normally lying close together across the tread of the tire.

It is intended that the chains shall be so applied to the wheels that the cross straps 13 will engage the roadway before their associated metal chains 12. Thus with the wheels turning in the directions indicated by the arrows in Figs. 5, 6 and 7, the rubber straps will first engage the roadway and receive the brunt of the blow, and the steel chains relieved thereof by reason of their proximity to the rubber straps. Thus at all speeds and particularly at high speeds, the chains 12 will be relieved of considerable pounding, thereby increasing the life thereof and reducing noise.

It has been found that at speeds of approximately 5 miles per hour, the cross members 12 and 13 will engage the roadway somewhat as shown in Figs. 5 and 6, that is, as the wheels roll from the straps 13, the cross chains 12 will take the load of the wheel and function as non-skid members after the manner of ordinary tire chains. It is at these lower speeds, as when starting or stopping, that it is desired that the steel chains shall be most effective. At the same time, the advantages incident to the use of rubber cross straps or the like on certain surfaces are secured.

In case brakes are being applied, the rotative movement of the wheel is of course retarded, with consequent tendency for the chains 12 to drag, upon contact with the roadway. The chains 12 will tend to drag or roll also at slow driving speeds, and thus separate somewhat from the straps 13. This separation may be as much as three inches, as shown in Fig. 8, and therefore the chains 12 are approximately as fully effective under such conditions as though the straps 13 were not present.

At speeds of approximately twenty miles per hour, the cross chains 12 will engage the roadway only slightly, by reason of the upthrust imparted to the wheel through contact of the strap 13 with the roadway. At higher speeds, say forty miles per hour, the upthrust on the strap 13 when it engages the roadway is so great as to exert in effect a bounding action that will prevent the chain 12 from engaging the roadway to any appreciable degree, or perhaps prevent it from touching the roadway at all.

It will be seen that not only do the rubber cross straps and the metal cross chains supplement one another in preventing skidding and slipping, but that in case the steel chains wear through, the rubber straps will still function as anti-skid members, and furthermore, will hold the side chains 11 under tension and prevent slapping of broken links against the fenders. The life of the metallic cross chains is increased, not only because they are relieved of pounding and consequent crystallization at high speeds, but they may be almost completely worn through before they will break. Furthermore, when the chains are removed from the wheels, the straps 13, because of their stiffness, will prevent kinking and tangling of the metal links of both the side chains and the cross chains. Again, the cross chains 12 serve to protect or relieve the rubber cross straps against great tearing strains under severe tractive conditions, thus preventing tearing apart of the rubber straps.

Referring now to Fig. 9, we show a structure wherein a single hook 17 is provided for connecting the cross members 12a and 13a to the side chains. The hook has seats formed therein for the ends of the cross members, such seats being spaced apart to hold the cross members in slightly spaced relation instead of maintaining them in approximate contact with one another as in Fig. 1. By this arrangement, the chain 12a will, of course, engage with the roadway more firmly at lower speeds, and will not be maintained entirely out of engagement with the roadway except at perhaps extremely high speeds. The degree to which the metallic links engage the roadway will depend somewhat also upon the thickness of the strap 13a. This strap will, in some cases, be made thicker than the strap 13, so that the protection afforded thereby to the chain 12a may more closely approximate the protection of the chains 12 by the straps 13. At the same time, greater assurance is had that the cross chains 12a will, under braking forces, be dragged far enough away from the straps 13a that their retardant action is not affected by the straps.

We claim as our invention:—

1. Tire chain structure comprising cross members arranged in pairs, one member of each pair being composed of metallic links and the other member being of non-metallic material, the members of each pair being disposed in proximity to one another, and being of closely similar width and thickness, so that at the higher speeds, with the non-metallic members in advance of the said links, the links will be prevented from engaging the roadway.

2. Tire chain structure comprising cross members arranged in pairs, one member of each pair being composed of metal links and the other member being of non-metallic material, the members of each pair being disposed in proximity to one another, and the non-metallic member being of narrow width relative to the distance between said pairs.

3. Tire chain structure comprising cross members arranged in pairs, one member of each pair being composed of metal links and the other member being of non-metallic material, the members of each pair being disposed in proximity to one another, and the non-metallic member being of a width not substantially greater than the width of the said links.

4. Tire chain structure comprising cross members arranged in pairs, one member of each pair being composed of metal links, and the other member being of non-metallic material, the members of each pair being disposed in proximity to one another and of approximately the same width, the distance between adjacent pairs of said members being greater than the normal distance between the members of each pair.

5. Tire chain structure comprising cross members arranged in pairs, one member of each pair being composed of metal links and the other member being of non-metallic material, the members of each pair being disposed in proximity to one another and each member arranged so it may directly engage the tread of a tire to which the structure is applied, and the metallic links being so arranged that they are at all times maintained in closer proximity to their associated non-metallic members than to the cross members of the other pairs.

6. Tire chain structure comprising cross members arranged in pairs, one member of each pair being composed of metal links and the other member of non-metallic material, the members of each pair being so positioned relative to one another and of such dimension that at predetermined low speeds the metallic links will be cause to engage the roadway, while at higher predetermined speeds, the metallic links will be prevented from engaging the roadway.

7. Tire chain structure comprising cross members arranged in pairs, one member of each pair being composed of metal links and the other member of non-metallic material, the members of each pair being so positioned relative to one another and of such dimension that at predetermined low speeds the metallic links will be caused to engage the roadway, while at higher predetermined speeds, the metallic links will be prevented from engaging the roadway, the cross members being loosely supported to permit separation of the members of each pair under tractive stresses.

8. Tire chain structure comprising cross members arranged in pairs, one member of each pair being composed of metallic links, and the other members of flexible non-metallic material, the members of each pair normally being disposed in proximity to one another, and means for loosely connecting the ends of the cross members to supporting members at the sides of a tire in such manner as to cause the said members to normally lie substantially in contact with one another, the flexibility of said members being such that they may separate from one another adjacent to their mid portions during rotation of a wheel to which they are applied.

JAMES C. McKAY.
BENJAMIN J. KING.